United States Patent
Westfall et al.

(10) Patent No.: US 10,889,193 B2
(45) Date of Patent: Jan. 12, 2021

(54) ELECTRIFIED VEHICLE AND CHARGING SYSTEM

(71) Applicant: Ford Global Technologies, LLC, Dearborn, MI (US)

(72) Inventors: Christopher Robert Westfall, San Francisco, CA (US); Rathi Kannan Munukur, San Jose, CA (US); Christopher W. Bell, Livonia, MI (US); John Paul Gibeau, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 124 days.

(21) Appl. No.: 16/217,811

(22) Filed: Dec. 12, 2018

(65) Prior Publication Data

US 2020/0189405 A1   Jun. 18, 2020

(51) Int. Cl.
*B60L 53/14* (2019.01)
*B60L 53/35* (2019.01)
*H02J 50/90* (2016.01)
*B60L 53/16* (2019.01)
*B60L 53/30* (2019.01)
*H02J 7/34* (2006.01)

(52) U.S. Cl.
CPC .............. *B60L 53/14* (2019.02); *B60L 53/16* (2019.02); *B60L 53/30* (2019.02); *B60L 53/35* (2019.02); *H02J 50/90* (2016.02); *H02J 7/342* (2020.01); *H02J 2310/48* (2020.01); *Y02T 90/12* (2013.01)

(58) Field of Classification Search
CPC . Y02T 90/14; Y02T 10/7005; Y02T 10/7088; Y02T 90/125; Y02T 10/72; Y02T 90/12; B60L 53/14; B60L 53/16; B60L 53/35; B60L 53/36; B60L 7/12; H02J 2310/48; H02J 50/90; H02J 7/342
See application file for complete search history.

(56) References Cited

U.S. PATENT DOCUMENTS

| | | | |
|---|---|---|---|
| 5,850,135 A * | 12/1998 | Kuki ................. | H02J 50/10 320/108 |
| 8,384,344 B1 * | 2/2013 | Rogers ............... | B60L 53/31 320/104 |
| 8,917,056 B2 | 12/2014 | Jung | |
| 9,718,367 B2 * | 8/2017 | McGrath ............ | B60L 53/68 |
| 9,754,300 B2 * | 9/2017 | Kempton ........... | G06Q 20/085 |
| 2016/0082848 A1 | 3/2016 | Ichikawa et al. | |
| 2016/0114686 A1 * | 4/2016 | Beattie, Jr. ......... | B60L 53/12 320/108 |
| 2016/0185239 A1 * | 6/2016 | Weigel ............... | B60L 53/16 320/109 |
| 2017/0129353 A1 | 5/2017 | Bois et al. | |
| 2018/0222741 A1 * | 8/2018 | Cox .................... | B67D 7/065 |
| 2018/0281611 A1 * | 10/2018 | Sebestyen .......... | B60L 53/36 |

* cited by examiner

*Primary Examiner* — Helen Rossoshek
(74) *Attorney, Agent, or Firm* — David B Kelley; Brooks Kushman PC

(57) ABSTRACT

An electrically-propelled vehicle includes a traction battery and a conductive charging pad disposed beneath the vehicle and electrically coupled to the battery. The charging pad is configured to transfer power from at least one contact extension disposed at a charge station to charge the battery. A height from ground of the charging pad is configured to cause electrical engagement of the contact extension as a result of the vehicle entering a parking space proximate the charge station.

18 Claims, 6 Drawing Sheets

ELECTRIFIED VEHICLE AND CHARGING SYSTEM

TECHNICAL FIELD

The present disclosure relates to electrified vehicles and charging systems therefor.

BACKGROUND

Powertrain electrification is used by automakers to improve fuel economy. These systems can have higher electrical ratings and a use a number of high and low voltage components. Operators of electrified vehicles are required to ensure that battery power is not depleted beyond operable ranges. Commonly this requires an operator to affirmatively make an electrical connection between the vehicle and a charging station in order to recharge a vehicle's traction battery.

SUMMARY

An electrically-propelled vehicle includes a traction battery and a conductive charging pad disposed beneath the vehicle and electrically coupled to the battery. The charging pad is configured to transfer power from at least one contact extension disposed at a charge station to charge the battery. A height from ground of the charging pad is configured to cause electrical engagement of the contact extension as a result of the vehicle entering a parking space proximate the charge station.

A charging station for an electrified vehicle includes a power inlet and a frame configured to secure to a parking barrier. The charging station also includes a plurality of contact extensions protruding from the frame and electrically coupled to the power inlet. Each of the contact extensions is flexible and adapted to deflect in response to engagement with a charging pad disposed on an underside of the electrified vehicle.

A vehicle includes a propulsion system powered by a traction battery and a conductive charging pad electrically coupled to the battery. The vehicle also includes a controller programmed to detect a proximity of the vehicle to a charge station. The controller is also programmed to issue a request to initiate a charge procedure in response to detecting electrical contact between the charging pad and a contact extension of the charging station. Electrical contact between the charging pad and the contact extension is caused as a result of the vehicle entering a parking space proximate the charge station.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the present disclosure may be suitable for car sharing programs since a vehicle's driver may change multiple times in a given day and the car may require recharging more than once during that time. An ideal user experience may avoid the need for a customer to be responsible for remembering to arrange for recharging. For example, a customer who forgets to recharge the car may end up frustrating their experience of the next person to use the car. Conversely, if recharging can be automatically performed by the car and charger without participation by the customer, an enhanced user experience may be achieved.

Aspects of the present disclosure also eliminate tripping hazards of some current electric charging systems having external wire connections that hang near the car during charging. Elimination of the external wire connections may also provide a cleaner visual aesthetic.

Figure 1:
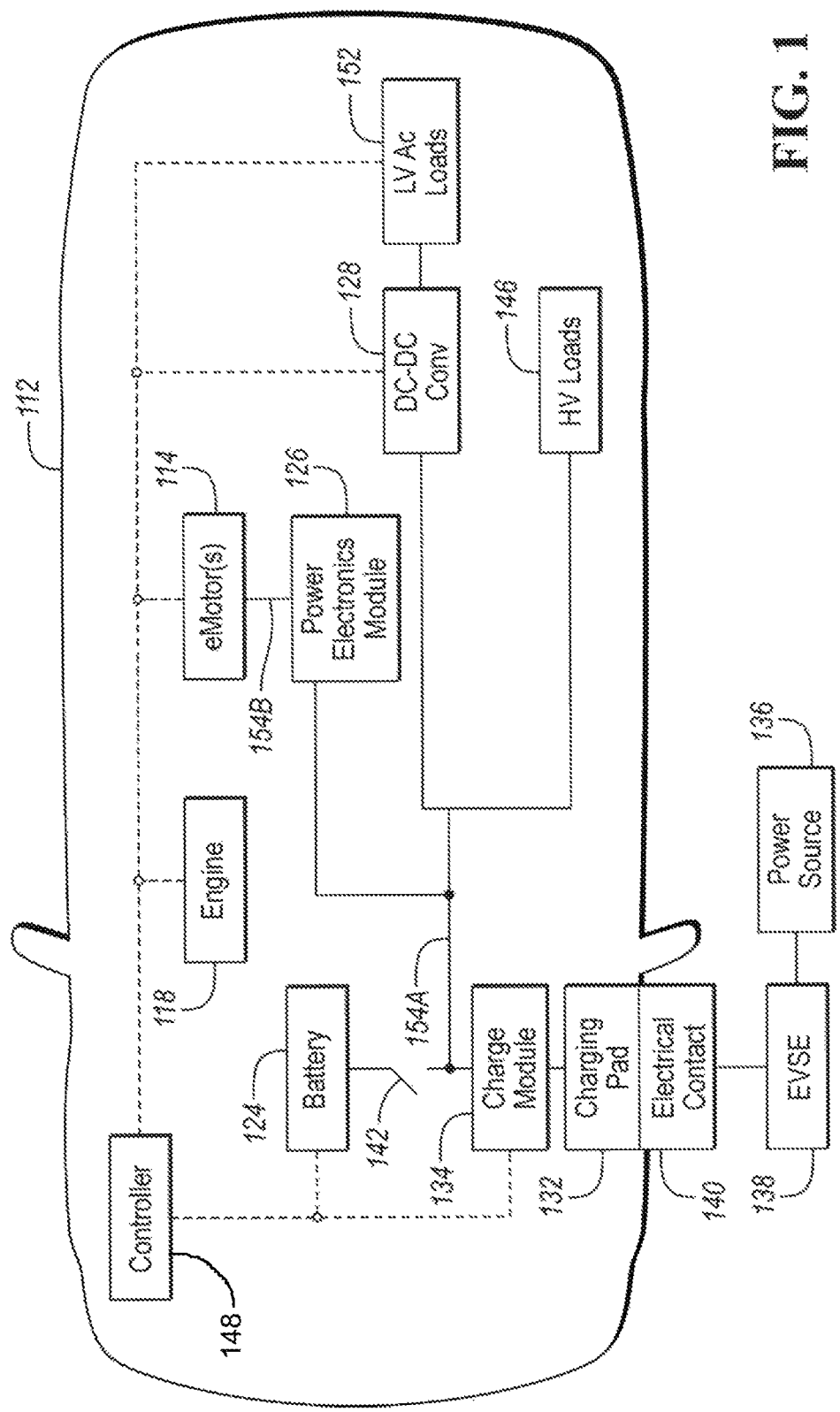
FIG. 1 is schematic of an electrically-powered vehicle.

FIG. 1 depicts a hybrid-electric vehicle (HEV) 112. The HEV 112 includes an electrified propulsion system having one or more electric machines 114 mechanically coupled to a hybrid transmission (not shown). The electric machines 114 may be capable of operating as a motor or a generator. In addition, the hybrid transmission is mechanically coupled to an internal combustion engine 118 (ICE). The electric machines 114 are arranged to provide propulsion torque as well as deceleration torque capability either while the ICE 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the ICE 118 to operate near the most efficient speed and torque ranges. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or ICE 118.

A traction battery or battery pack 124 stores energy that can be used to power the electric machines 114. The battery pack 124 typically provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage loads 152 may be electrically coupled to the low-voltage bus 156. The low-voltage loads 152 may include various controllers within the vehicle 112.

The traction battery 124 may be recharged by an off-board power source 136. The off-board power source 136 may be a connection to an electrical outlet or other power supply. The external power source 136 may be electrically coupled to a charging station or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes at least one electrical contact 140 for passing power to a charging pad 132 of the vehicle 112. As discussed in more detail below, the charging pad 132 is configured to receive conductive charge from one or more electrical contacts 140. The electrical contacts 140 may include pins that mate with corresponding features of the charging pad 132. The charging pad 132 is electrically coupled to a conductive charging interface module 134 configured to manage power transfer during charge procedures. The conductive charging interface module 134 may also be programmed to condition power supplied from the EVSE 138 to provide the proper voltage and current levels to the traction battery 124. The conductive charging interface module 134 also interfaces with the EVSE 138 to coordinate the delivery of power to the vehicle 112. The charge components including the charging pad 132, conductive charging interface module 134, power electronics module 126, and DC/DC converter module 128 may collectively be considered part of a power interface system configured to receive power from the off-board power source 136.

In some examples, the conductive charging interface module 134 is programmed to provide a proximity function to indicate the position of the vehicle relative to a charging station, as well as indicate when the vehicle is physically connected. More specifically, the charging interface module 134 may monitor a signal based on a removable resistance load along a proximity line. Alternatively, a charge station may output a wireless signal to the vehicle indicative of proximity, such as for example an RFID or Wi-Fi signal. If the vehicle is equipped with an RFID tag, it may be serve the dual purposes of both proximity detection as well as identification of the vehicle to a charge station. The charging interface module may be programmed to detect a vehicle proximity to the charge station and in response to the vehicle proximity less than a predetermined distance while the battery state of charge (SOC) is less than a charge threshold, issue a charge request to the charge station.

In some examples, the conductive charging interface module 134 is programmed to select the particular power input to be used for recharging. If a vehicle equipped with a plug-in charge interface is retrofit with a conductive charge pad as discussed herein, the charge interface module may control internal relays to avoid the power inlet to the battery from developing excessive heat.

In additional examples, the conductive charging interface module 134 is programmed to issue a pilot signal indicative of a requested amount of power desired to be supplied by a charge station. In this way power ratings of charge stations may be standardized, yet each vehicle may individually control the amount power delivered during charge based on its particular power rating, SOC, or other electrical parameters specific to the conditions and/or vehicle.

In further examples, the conductive charging interface module 134 is programmed to interface with the vehicle controller 148 to influence when a diver is allowed to start the vehicle when a charge procedure is underway. Specifically, the charging interface module 134 may output a signal to prevent the vehicle from starting during a charge procedure. In response to detection of a driver intent to drive away (e.g., driver input at the ignition), the charging interface module 134 may cause the charge procedure to terminate.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include components such as compressors and electric heaters. According to a specific example, a vehicle air conditioning system may draw as much as 6 kW under high cooling loads.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. The controller 148 may monitor operating conditions of the various vehicle components. According to the example of FIG. 1, at least the electric machines 114, engine 118, traction battery 124, DC/DC converter 128, charging module 134, and high-voltage loads 146, and low-voltage loads 152 are in communication with the controller 148. The traction battery 124 also includes a current sensor to sense current that flows through the traction battery 124. The traction battery 124 also includes a voltage sensor to sense a voltage across terminals of the traction battery 124. The voltage sensor outputs a signal indicative of the voltage across the terminals of the traction battery 124. The traction battery current sensor outputs a signal indicative of a magnitude and direction of current flowing into or out of the traction battery 124.

The charging interface module 134 also includes a current sensor to sense current that flows from the EVSE 138 to the traction battery 124. The engine 118 coupled to the electric machine 114 generates an AC current that is converted to a DC current by the power electronics module 126. The engine 118 may be controlled by a powertrain control module having at least one controller in connection with the system controller 148. The current sensor of the charging interface module 134 outputs a signal indicative of a magnitude and direction of current flowing from the EVSE 138 to the traction battery 124.

The current sensor and voltage sensor outputs of the traction battery 124 are provided to the controller 148. The controller 148 may be programmed to compute SOC based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

The controller 148 may also be configured to monitor the status of the traction battery 124. The controller 148 includes at least one processor that controls at least some portion of the operation of the controller 148. The processor allows onboard processing of commands and executes any number of predetermined routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

A desired SOC operating range may be defined for the traction battery 124. The operating ranges may define an upper and lower limit at which the SOC of the battery 124 is bounded. During vehicle operation, the controller 148 may be configured to maintain the SOC of the battery 124 within the desired operating range. In this regard, the battery may be recharged by the engine while the vehicle is in operation. In other cases, the battery is recharged when at rest and connected to an off-board power source. Based on a rate of battery depletion and/or recharge, charging of the traction battery may be scheduled in advance based on approaching an SOC low threshold. The timing and rate of recharging may also be opportunistically selected to maintain voltage and SOC within predetermined ranges to avoid battery damage.

Figure 2:
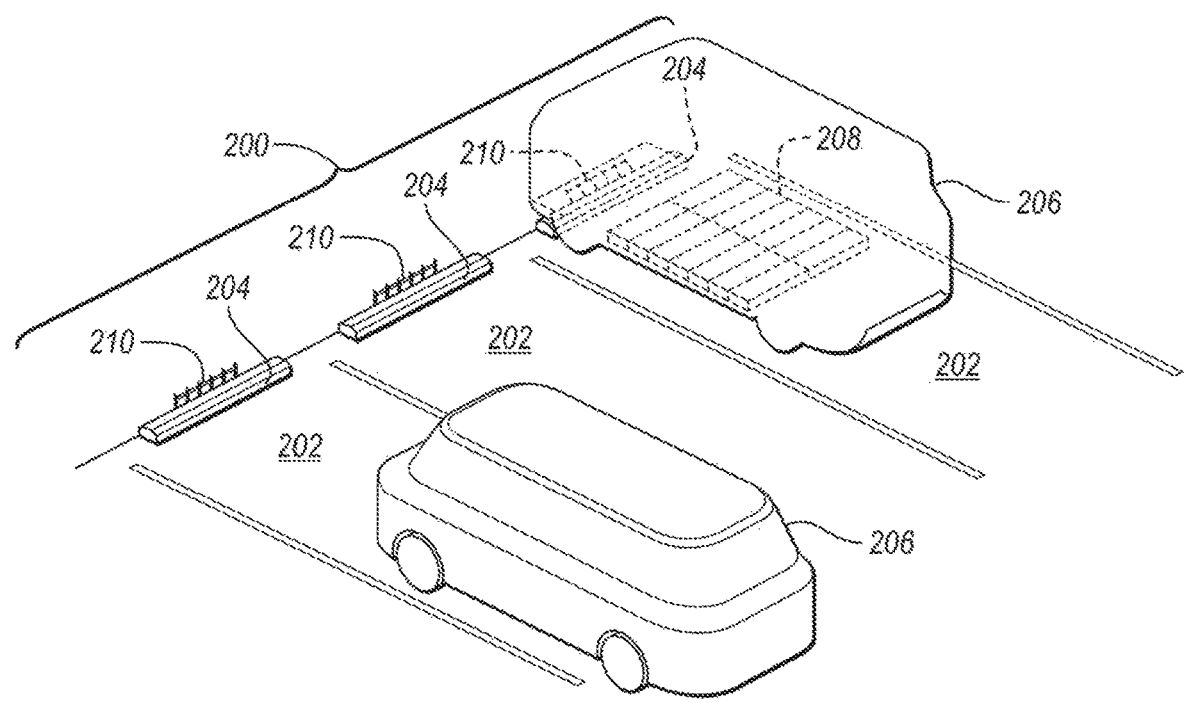
FIG. 2 is a perspective view of electrically-powered vehicles at a charging station

FIG. 2 is a perspective view of a series of charging stations 200. Each of the charging stations is positioned near an end of a parking space 202. According to at least one example, at least one of the charging stations is integrated as part of a parking barrier 204 such as a concrete curb or stop block. An electrified vehicle 206, such as that discussed above, may be configured with a traction battery 208 capable of being recharged once a stored charge is at least partially depleted. As the electrified vehicle 206 approaches a parked position within a parking space 202, one or more contact elements 210 engages the vehicle 206. According to some examples the vehicle 206 is pulled forward into the parking space 202 until at least one of the vehicle's tires makes contact with the parking barrier 204. Contact between the vehicle and the barrier may signal a driver that the vehicle 206 has gone far enough to automatically begin a charge procedure as well as protect the charging station 200 from being damaged by the vehicle 206. Alternatively, the charging station may be sized so that as long as the vehicle is parked between the parking lines and the tires within a predetermined proximity from contacting the parking barrier 204, a full electric connection is made to allow for charging. Discussed in more detail below, the vehicle 206 may include one or more receiving elements near an underside portion of the vehicle to engage a contact element 210. In this way, electrical contact may be automatically made between the charging station 200 and the vehicle 206 during parking without a user having to manually connect the vehicle.

The automatic direct connection systems of the present disclosure relieve a driver from having to manage electrified vehicle recharging. In one example use case, an automatic direct connection charging system may by particularly useful with a car sharing program. Due to a potentially large number of different drivers, certain of the drivers may be more likely forget to recharge the vehicle. And, since recharging generally takes longer than refilling petrol fuel, it is useful to recharge during times the vehicle is parked. Regardless of the duration that the vehicle is parked, the time in which the vehicle is stationary may be effectively utilized for recharging. According to other aspects of the present disclosure, recharging stops when the electrified vehicle departs from the parking space. According to further aspects of the present disclosure, an automatic dire connection charging system avoids the need for unsightly charging wires which can also be tripping hazards in public spaces. According to further aspects of the present disclosure, charging system infrastructure can be added to existing parking spaces with minimal modification to the existing infrastructure. Therefore, charging stations according to the present disclosure may be integrated into existing parking locations such as at a user's home or at other common areas such as parking lots at apartments and shopping centers.

Figure 3:
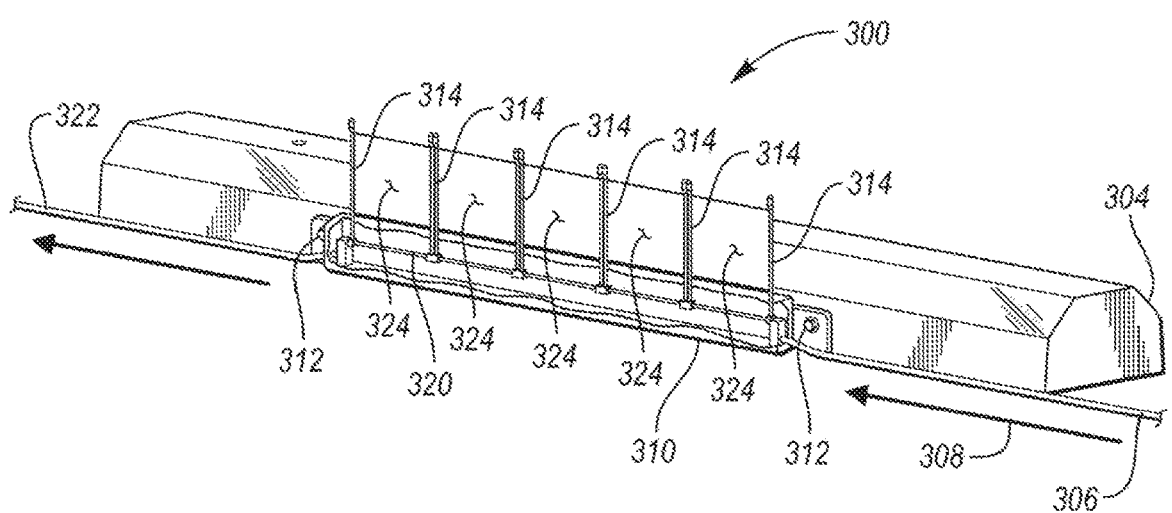
FIG. 3 is a perspective view of a first example charging station.
Figure 4:
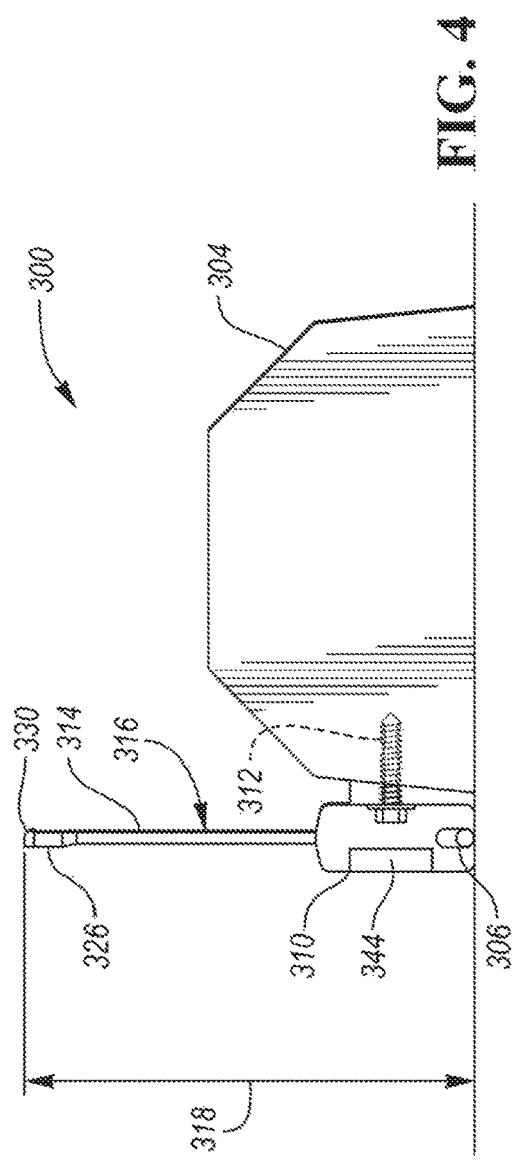
FIG. 4 is an end view of the charging station of FIG. 3.
Figure 5:
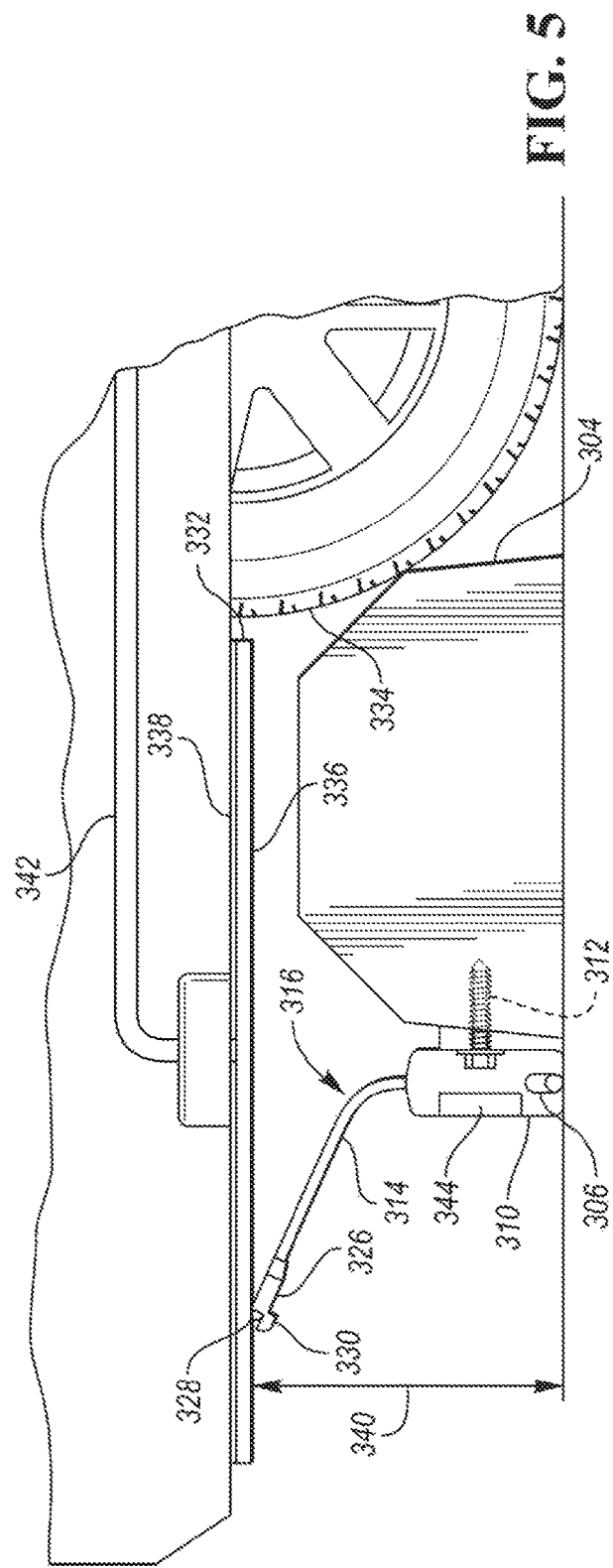
FIG. 5 is an end view of the charging station of FIG. 3 engaged with a vehicle.

Referring collectively to FIG. 3 through FIG. 5, a charging station 300 is integrated as part of a parking barrier 304. A power supply line 306 is connected to a power source (not shown) and provides power flow along a direction of arrow 308. A frame 310 is affixed to the parking barrier 304 by at least one fastener 312. While any number of connection methods may be suitable, a fastener 312, such as a bolt, may make retrofitting an existing concrete parking barrier with a charger to create a charge station quick and convenient.

At least one charging element is secured to the frame 310. According the examples of FIGS. 3 through 5, each of a plurality of contact extensions 314 is generally vertical and includes a flexible portion 316. Each contact extension 314 may comprise an internal electric wire surrounded by a wire housing made from an elastomeric material. The wire housing material facilitates flexure of the contact extension 314 and also supports resuming of the original upright position when the vehicle departs from the parking space. Each of the contact extensions 314 extends upwardly from the frame 310 by a predetermined length sufficient to protrude above the height of the parking barrier 304. In one specific example, an extension height 318 from the ground is equal to about 208 mm. This extension height 318 may be predetermined to be compatible with a wide variety of electric cars. As discussed in more detail below, the contact extensions 314 are is taller than the height of a corresponding vehicle charging pad such that bending occurs in the contact extensions and in turn the extensions create upward contact pressure against the charging pad. The stiffness of the contact extensions may be configured to generate a desired upward contact pressure to maintain a consistent electrical connection.

The contact extensions 314 are electrically connected to the power supply line 306 by a wire 320. Power is supplied to the power supply line 306 from a nearby power source (not shown). The power supply line 306 may be either buried underground or run above ground. Power enters the frame 310 through a wire connector which connects to an internal wire, and smaller wire connectors branch off power to each contact extension 314. The power supply line 306 may also include a transfer portion 322 that exits the frame 310 and passes power to another charging station. In this way, multiple parking barriers may each be converted into a series of charging stations that are provided power from the same power supply. A ground fault interrupt (GFCI) circuit may also be integrated as part of the power supply line 306 to include a separate ground line. Each of the ground line and the body of the vehicle may provide a path for fault currents to be relieved so that the system may be promptly shut down.

Depending on the desired electrical configuration, the power supply may be connected to the multiple charging stations either in series or in parallel. According to some examples, power supplied in parallel to a plurality of charging stations 300 may be more suitable if it is desired to track individual usage such as when customers are to be charged for the power utilized. Payment may be made through a kiosk as found in road side parking. Alternatively, in scenarios where vehicle recharging is provided without individual billing, the power supply can remain in series so that there is only a single payer for the total electricity used.

Each of the contact extensions 314 are connected by a ribbon 324 such that each of the contact extensions is able to move independently relative to other contact extensions. In this way, the charging station 300 may accommodate vehicles that are misaligned within the parking space and located at an oblique angle. More specifically, as a misaligned vehicle engages the charging station, a contact extension 314 located toward a first end of the parking barrier 304 may deflect by a different amount than a contact extension located towards a second opposite end of the parking barrier. The independent flexibility of each of the contact extensions 314 provides greater robustness against variability of vehicle parking positions.

The contact extensions 314 also include an articulable protective cover 326 at a distal end. The protective cover 326 shields the internal electric wire from being exposed when not in use. The protective cover 326 is configured to articulate from a closed protected position to an open position to expose a conductive tip 328. According to some examples, the protective cover 326 includes a hinged cap portion 330 that is flexed upon contact with a charging pad 332 beneath the vehicle. When the vehicle comes in contact with cap portion 330, it flips back along its hinge to reveal the charging point of the conductive tip 328. The cap portion is arranged to hinge to an open position when engaged with the charging pad to expose the conductive tip.

The charging pad 332 may be configured to include two layers. A conductive layer 336 is formed on a bottom side from a conductive metal material. A insulative layer 338 is disposed between the conductive layer 336 and the rest of the vehicle. The configuration of the charging pad 332 allows it to be retrofit to an existing electric vehicle. If the vehicle is previously equipped with a plugin charging port, the conductive charging system of the present disclosure may be installed to work alongside the existing charging port. Also, the charging pad may be installed near the front of a vehicle, near the rear of the vehicle, or at both locations.

When the vehicle is pulled into a charging position, for example such as where the vehicle wheel 334 makes contact with the parking barrier 304, the charging pad 332 forces the articulable cover 326 open to allow contact between the conductive tip 328 and the conductive layer 336. According to the example of FIG. 5, contact between the charging pad 332 and the contact extension 314 forces the hinged cap portion 330 to an open position. Contact between the charging pad 332 and the contact extension 314 also deflects the flexible portion 316 of the contact extension 314 such that a range of different heights 340 of the charging pad 332 may be accommodated. Once contact is made between the charging pad 332 and the conductive tip 328, power is supplied to the contact extension 314. The charging pad 332 then transfers power received from the charging station 300 along a transfer wire 342 to recharge the vehicle battery.

The charging station 300 may also include a charge controller 344 to influence behavior of the charge station. The charge controller 344 may be programmed to prevent power application to the contact extensions 314 when no vehicle is present. For example, a proximity or pilot line may be provided as a means to indicate that a vehicle is physically connected to the charging station. Alternatively, the charge controller may monitor for a wireless signal output from the vehicle, such as a RFID tag output, WiFi, Bluetooth or other wireless outputs that the vehicle may use to broadcast its position and/or state of connection to the charger.

The charge controller 344 may also be programmed to monitor the status of the vehicle and driver inputs to detect a driver intent for the vehicle to depart the charge station 300. For example, the charge controller may monitor vehicle CAN traffic for driver inputs such as an ignition start command or parking brake deactivation command. In response to detection of a driver intent for the vehicle to depart (i.e., the vehicle changing from a stationary motive state to a drive-enabled motive state), the charge controller is programmed to terminate an ongoing charge procedure. Said another way, charge controller 344 may be further programmed to monitor the motive state of the electrified vehicle, and in response to a detection of a change from stationary motive state to a drive-enabled motive state, terminate an active charge procedure The charge controller 344 is further programmed to limit power output from the charge station so as not to exceed power ratings of the charge station. As discussed above, different vehicles may be configured to request differing quantities of power depending on vehicle power rating, SOC, environmental conditions, or other electrical parameters. In response to detection of a power request greater than a power rating of the charge station, the charge controller is programmed to limit power flow to a predetermined power maximum.

In further examples, the charge controller 344 is programmed to accept a user interface at the charge station to control charge procedures. For example, a user interface (not shown) at the frame 310 may be provided to accept user input to reset the charge station, halt a charge procedure, initiate a charge procedure, remit payment for charging, or other user inputs.

Figure 6:
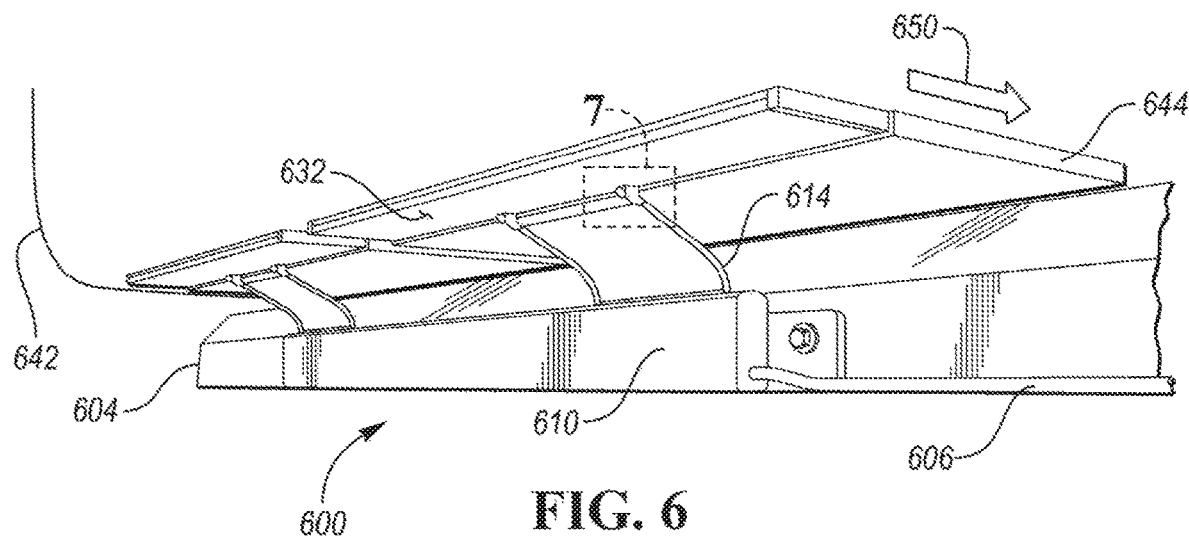
FIG. 6 is a perspective view of a second example charging station engaged with a vehicle.
Figure 7:
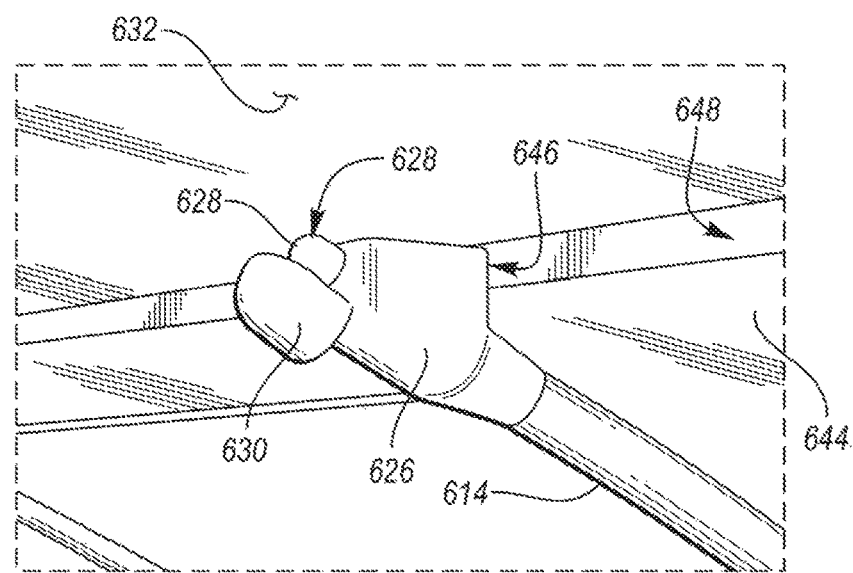
FIG. 7 is an enlarged view of a contact element of the charging station of FIG. 6.

Referring collectively to FIG. 6 and FIG. 7, an alternative embodiment charging station 600 is compatible with an articulating protective cover at a vehicle charging pad. The protective charging pad cover is configured to shield the charging pad 632 from debris or other damage while the vehicle is not at a charge station such as during driving. FIG. 6 depicts vehicle 642 having a charging pad cover 644 that is engaged with a charging station 600. Each of the contact extensions 614 may include an engagement feature 646 to cause movement of the charging pad cover 644 when the vehicle engages the charging station 600. In the example of FIG. 6 and FIG. 7, a ledge protrudes from an upper portion of the body of the protective cover 626. As the vehicle converges upon the charge station (i.e., getting closer to a position required for charging), the ledge makes contact with a leading edge portion 648 of the charging pad cover 644 and causes the cover to slide towards an open position along the direction of arrow 650. In at least one example, the sliding movement is caused by the pressure of the engagement feature 646 against the leading edge portion 648 becoming greater than the force of a return spring which biases the charging pad cover 644 towards a closed position. In alternate examples, a powered actuator may be provided at the vehicle to move the cover to an open position in response to detecting contact of the protective cover 626 with the charging pad cover 644. In further examples, an actuator provided at the vehicle may be caused to actuate the charging pad cover 644 in response to detection that the vehicle has entered a predetermined proximity to the charging station 600.

Once the charging pad cover 644 is moved to an open position, the charging pad 632 is exposed and available for direct contact with the contact extension 614. Similar to previous examples, the protective cover 626 may include a hinged cap portion 630 that is forced to an open position by the charging pad 632. Once the cap portion is hinged to the open position, the conductive tip 628 is exposed to contact the charging pad 632 to allow the passing of electrical charge to the vehicle.

Figure 8:
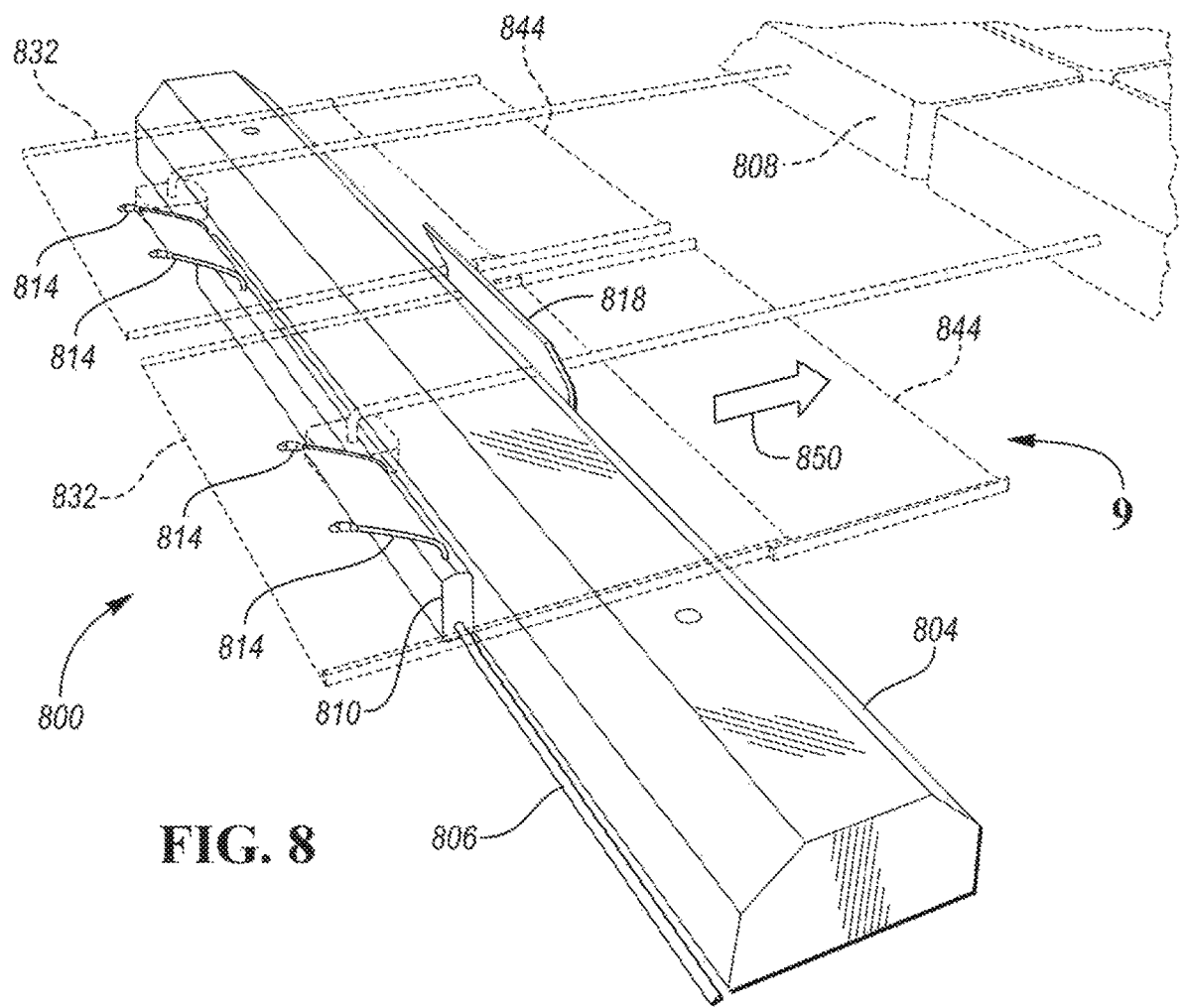
FIG. 8 is a perspective view of a third example charging station engaged with a vehicle.
Figure 9:
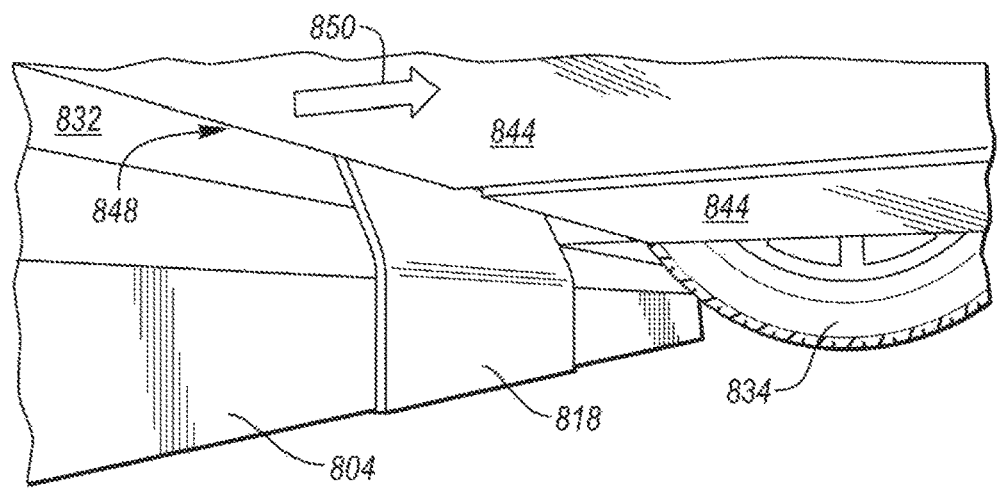
FIG. 9 is an underside perspective view of the charging station of FIG. 8.

Referring collectively to FIG. 8 and FIG. 9, a further alternative embodiment charging station 800 is also compatible with an articulating protective cover at a vehicle charging pad. The protective cover is configured to shield the charging pad 832 from debris or other damage while the vehicle is not at a charge station such as during driving. In the example of FIG. 8, a separate, stationary pusher element 818 extends from a parking barrier 804. The height of the pusher element 818 relative to the protective cover 844 is such that the pusher engages a leading edge portion 848 of the cover when the vehicle converges upon the charging station (i.e., approaching a final charging position). Force from the engagement between the pusher element 818 and the protective cover 844 causes the cover to slide along the direction of arrow 850 toward an open position. In this way, the charging pad 832 becomes exposed in order to make contact with one or more contact extensions 814 in order to pass charge to the battery 808.

In the examples of FIGS. 8 and 9, the pusher element 818 is attached to a connecting portion 852 that extends beneath a lower portion of the parking barrier 804 and connects the pusher element 818 to the frame 810. In this way the weight of the parking barrier 804 itself may help to secure the charging station in place with the need for additional fastening to the parking barrier 804. Such a configuration may be simple to install by lifting the barrier and placing the horizontal portion of the pusher element beneath the footprint of the barrier. Once the barrier is lowered to its original position, its weight applied to the charging station may avoid the need for drilling fasteners into a concrete barrier.

Figure 10:
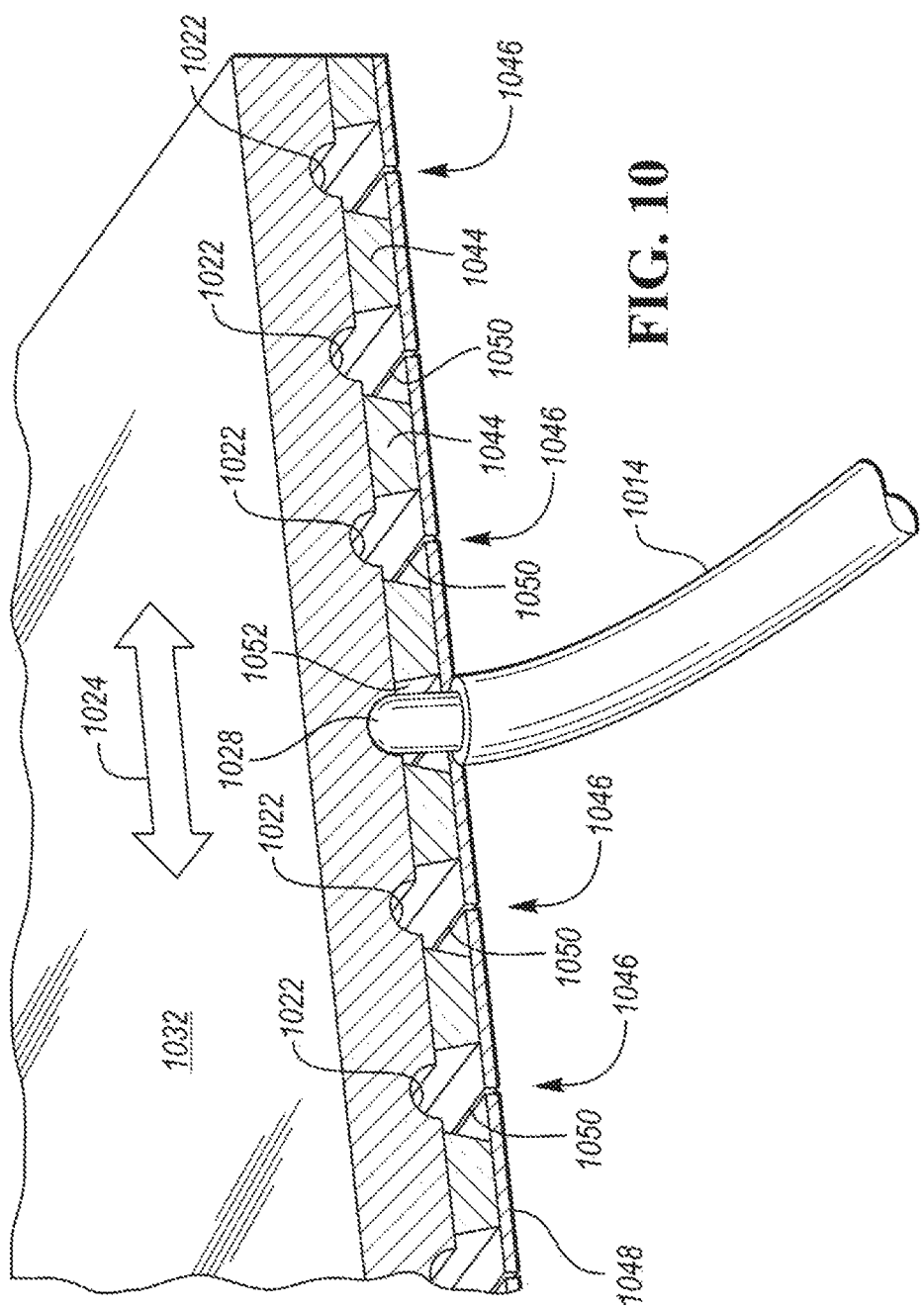
FIG. 10 is a cutaway view of a contact element of a fourth example charging station.

Referring to FIG. 10, a further example is provided for a direct connect charging system to automatically engage a vehicle charge plate. At least one contact extension 1014 extends from a portion of a charge station similar to examples described above in order to pass power to a vehicle charging pad 1032 for recharging. In the example of FIG. 10, the charging pad 1032 is provided with a plurality of lateral grooves 1022 to receive a conductive tip portion 1028 of the contact extension 1014. As the vehicle travels in a longitudinal direction such as indicated by arrow 1024, the flexible contact extension 1014 may carry sufficient upward contact force against the charge plate to nest into a lateral groove 1022 pass charge. Depending on the final stop position, the contact extension 1014 nests into the closest lateral groove to allow for the initiation of a charge procedure. While the grooves provided for charging are presented as lateral by way of example, it should be appreciated that other geometric orientations may be suitable to allow a contact extension to automatically nest therein to enable charging.

With continued reference to FIG. 10, vehicle may be provided with a protective cover 1044 that shields the lateral groove flexible cover portions when not being used for charging. The protective cover 1044 includes a number of openings 1046, each corresponding to a lateral groove 1022. The protective cover 1044 also includes an outer layer 1048 formed from an insulative material, for example such as a flexible polymer. The outer layer includes a slit portion 1050 corresponding to each lateral groove 1022 to create an opening through which the conductive tip 1028 is allowed to pass. When the contact extension 1014 nests in one of the lateral grooves 1022, the portions of the flexible outer layer 1048 operate as opposing flaps 1052 and are deflected aside by the contact extension. Conversely, when not engaged with a charge station the opposing flaps 1052 shield the conductive portions of the charging pad 1032 from the elements.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrically-propelled vehicle comprising:
a traction battery; and
a conductive charging pad disposed beneath the vehicle and electrically coupled to the battery to transfer power from at least one contact extension disposed at a charge station, wherein a height from ground of the charging pad is configured to cause electrical engagement of the contact extension as a result of the vehicle entering a parking space proximate the charge station, and wherein the at least one contact extension includes a cap portion arranged to hinge to an open position when engaged with the charging pad to expose a conductive tip of the contact extension that passes electrical charge.

2. The vehicle of claim 1 wherein the height from ground of the charging pad is less than an extension height of the at least one contact extension, and the contact extension includes a flexible portion adapted to deflect during engagement with the charging pad.

3. The vehicle of claim 1 further comprising an articulable cover disposed about the charging pad wherein the articulable cover is urged to an open position exposing the charge pad as a result of the vehicle entering the parking space proximate the charge station.

4. The vehicle of claim 3 wherein the at least one contact extension includes an engagement feature configured to force the articulable cover toward the open position as the vehicle converges upon the charge station.

5. The vehicle of claim 3 further comprising a charging interface module programmed to issue a command to move the articulable cover toward the open position in response to the vehicle converging to within a predetermined proximity to the charge station.

6. The vehicle of claim 1 further comprising a charging interface module programmed to detect a vehicle proximity to the charge station and in response to the vehicle proximity less than a predetermined distance while a battery state of charge is less than a charge threshold, issue a charge initiation request to the charge station.

7. The vehicle of claim 6 wherein the charging interface module is further programmed to issue a signal to request an amount of power desired to be supplied by the charge station.

8. The vehicle of claim 1 wherein the charging pad includes a plurality of grooves each configured to receive a conductive tip of at least one contact extension for passing charge to the traction battery.

9. A charging station for an electrified vehicle comprising:
a power inlet;
a frame configured to secure to a parking barrier; and
a plurality of contact extensions protruding from the frame and electrically coupled to the power inlet, wherein each of the contact extensions is flexible and adapted to deflect in response to engagement with a charging pad disposed on an underside of the electrified vehicle, wherein at least one of the contact extensions includes a cap portion arranged to hinge to an open position when engaged with the charging pad to expose a conductive tip of the contact extension that passes electrical charge.

10. The charging station of claim 9 wherein each of the plurality of contact extensions includes a protective cover arranged to articulate to an open position when engaged with the charging pad to expose a conductive tip of the contact extension that passes electrical charge to the electrified vehicle.

11. The charging station of claim 9 further comprising a stationary pusher element configured to press against an articulable cover of the charging pad when the electrified vehicle converges upon the charging station thereby urging the articulable cover towards an open position to expose the charging pad.

12. The charging station of claim 11 further comprising a connecting portion extending between the stationary pusher element and the frame, wherein the connecting portion extends beneath the parking barrier such that a weight of the parking barrier secures the charging station.

13. The charging station of claim 9 further comprising a charge controller programmed to monitor a motive state of the electrified vehicle, and in response to a detection of a change from stationary motive state to a drive-enabled motive state, terminate an active charge procedure.

14. A vehicle comprising:
a propulsion system powered by a traction battery;
a conductive charging pad electrically coupled to the battery; and
a controller programmed to
detect a proximity of the vehicle to a charge station, and
in response to detecting electrical contact between the charging pad and a contact extension of the charging station, issue a request to initiate a charge procedure,
wherein electrical contact is caused as a result of the vehicle entering a parking space proximate the charge station, and wherein the charging pad includes a plurality of grooves configured to receive a conductive tip of the contact extension for passing charge to the traction battery.

15. The vehicle of claim 14 further comprising an articulable cover disposed about the charging pad wherein the articulable cover is urged to an open position exposing the charge pad as a result of the vehicle entering the parking space proximate the charge station.

16. The vehicle of claim 15 wherein the contact extension includes an engagement feature configured to force the articulable cover toward the open position as the vehicle converges upon the charge station.

17. The vehicle of claim 15 wherein the controller is further programmed to issue a command to move the articulable cover toward the open position in response to the proximity of the vehicle to the charge station being less than a threshold.

18. The vehicle of claim 14 wherein a height from ground of the charging pad is less than an extension height of the contact extension, and the contact extension includes a flexible portion adapted to deflect during contact with the charging pad.

* * * * *